May 23, 1967     J. W. MONROE ETAL     3,320,795
CENTER OF GRAVITY LOCATING DEVICE
Filed Oct. 20, 1964

Joseph W. Monroe
Garland K. Grace
Richard O. Hessler,
    *INVENTORS.*

United States Patent Office 3,320,795
Patented May 23, 1967

3,320,795
CENTER OF GRAVITY LOCATING DEVICE
Joseph W. Monroe, Garland K. Grace, and Richard O. Hessler, Huntsville, Ala., assignors, by mesne assignments, to the United States of America as represented by the Secretary of the Army
Filed Oct. 20, 1964, Ser. No. 405,308
2 Claims. (Cl. 73—65)

This invention relates to a new device for locating the center of gravity of non-uniform shaped devices such as rocket motors. Since the modern rocket motor is not symmetrical and contains a plurality of components of various sizes and weights, it has become more and more difficult to accurately locate the center of gravity of the motor.

In the past, many devices have been suggested for locating the center of gravity of non-uniform objects. However, these devices have proved to be quite expensive and bulky, and in most cases lack the dependability and accuracy required to balance a rocket motor. Our device is particularly adapted to determine with extreme accuracy the center of gravity of any object, regardless of its size, weight or shape. In general, our invention concerns a device which utilizes counterweights on a balanced platform to rebalance the platform after the specimen has been placed thereon. A sighting means is attached to the platform for locating the original balance point of the platform in order that this point may be transferred by optical means to the specimen to be balanced. After rebalancing of the platform by means of movement of the counterweights, the center of gravity of the specimen is then easily calculated mathematically.

Accordingly, it is an object of this invention to provide a reliable and highly accurate device for locating the center of gravity of any object.

A further object of our invention is to provide a balancing device which is simple to operate while yet being very economical to manufacture.

Figure 1:
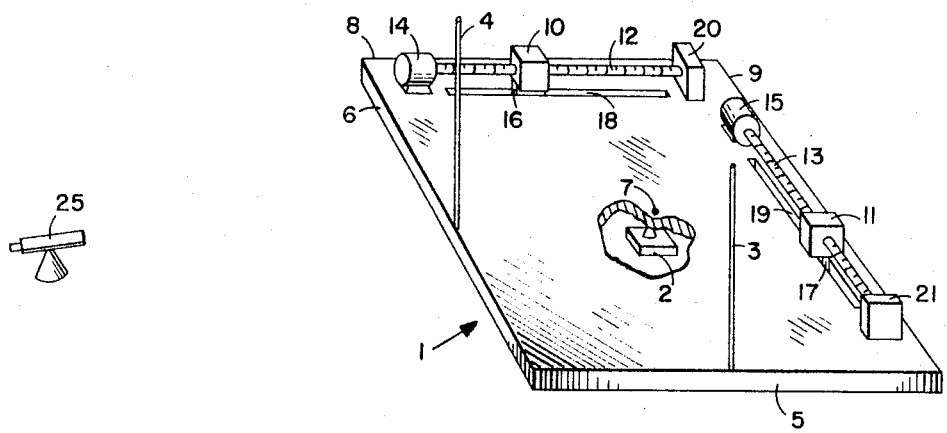
Figure 2:

This invention together with other objects and advantages will best be understood by reference to the following description and accompanying drawings in which:

FIGURE 1 is a perspective view of the device with portions cut away for purposes of clarity; and FIGURE 2 is a perspective view of the device showing fixed scopes being used as an optical alignment means.

Referring now to FIGURE 1, a balance platform 1 forms a suitable means for supporting the specimen to be balanced. This platform rests upon a pivot 2 which is located at the predetermined center of gravity of the platform including its accessories. Pivot mount 2, commonly referred to in the art as a "resolving center," represents a real or simulated single point suspension system. While not forming a part of the present invention, it is noted, for example, that the balance platform has as its supporting structure a floating frame (not shown) suspended on a plurality of legs (not shown) whose axes focus on the revolving center, the legs being attached between the floating frame and a base pedestal (not shown) by flexure pivots (not shown). Since such supporting structure is well known in the art and the same is not considered necessary for a clear understanding of the operation of the present invention, the same will not be described in further detail herein. A pair of vertical sight bars 3 and 4 are mounted intermediate platform edges 5 and 6. These bars provide convenient alignment means for transposing the center of gravity location 7 of the platform to the test specimen by means of telescopes or other external optical equipment 25, 26. Conventionally, these bars may have cross-hairs provided thereon or may carry a transparent target. Adjacent edges 8 and 9 of platform 1 are provided with counter weights 10 and 11 which are moveable by means of threaded shafts 12 and 13 respectively. Shafts 12 and 13 in turn, are actuated by motors 14 and 15. Counterweights 10 and 11 are guided in perpendicular paths by a pair of tanks 16 and 17 which follow grooves 18 and 19 formed in the surface of platform 1. The ends of rods 12 and 13 opposite the motors are rotatably supported by rod blocks 20 and 21.

The modification illustrated in FIGURE 2 differs from the device of FIGURE 1 only in that fixed optical aiming devices 37, 38 are provided on vertical bars 36 for transposing the center of gravity 32 of the platform 35 to the specimen. These fixed scopes eliminate the need for additional externally located sighting equipment such as would be needed in the operation of the device illustrated in FIGURE 1. It should be apparent that conventional means (not shown), e.g., a pair of spirit levels, may be provided on perpendicular edges of the balance platform to indicate when a balanced condition is reached. The counterweight apparatus and slots in the balance platform are omitted for simplification.

In operation of the device, platform 1 is placed upon pivot 2 and is balanced by movement of counterweights 10 and 11. The sight bars are aligned with outside optical equipment such as telescopes 25, 26 so as to define perpendicular lines which intersect exactly at the center of gravity 7 of the balanced platform. This balanced condition may also be checked by several well known methods, e.g., by a pair of spirit levels placed on perpendicular sides of the balance platform. The specimen is placed as nearly as possible to the center of gravity of the platform. To complete balancing of the platform with the specimen in place, motors 14 and 15 are actuated to move counterweights 10 and 11 to respective positions which will balance the entire combined device. By use of the sight bars and outside optical equipment the center of gravity point 7 of the combined device is projected to and marked on the specimen. The amount of movement of the counterweights from their original positions is then noted. It should be apparent that a conventional indicating means and dial (not shown) may be secured for rotation with shafts 12, 13 whereby the amount of linear movement of the counterweights may be read directly therefrom; or suitable indicia may be provided adjacent slots 18 and 19 for use in measuring the amount of movement. The center of gravity of the specimen is determined mathematically with this data by taking moments around any given point on the device and solving for the distance from the given point to the unknown center of gravity of the specimen. It is, of course, necessary to solve for the longitudinal location as well as the lateral location of the center of gravity of the specimen separately. Once determined, the center of gravity of the specimen will be marked on the specimen thus completing the operation. The device illustrated in FIGURE 2 operates in a similar manner, however, the fixed scopes 37 and 38 on bars 36 eliminate the need for separate externally located optical equipment. In this embodiment the balanced condition may be determined by several well known methods, e.g., by a pair of spirit levels (not shown) placed on adjacent, perpendicular sides of the balance platform. These fixed optical aiming devices locate the original center of gravity of the platform 31 and relocate this point on the specimen. The relocation of the platform balance point 32 provides a convenient point of reference for establishing and marking the calculated center of gravity of the specimen.

The foregoing is a description of the preferred embodiments. The following claims are intended to include those modifications in and variations that are within the spirit and scope of the invention.

We claim:
1. A center of gravity locating device comprising a horizontally disposed balance platform, said platform having a pair of elongated slots formed in adjacent perpendicular side edges thereof, a pair of counterweights, each of said counterweights being movably mounted adjacent said platform side edges and having a portion thereof received within one of said slots so as to be guided thereby, means for moving each of said counterweights in a vertical plane parallel to its respective platform edge, said means including a pair of motors and a threaded shaft operably connecting a respective motor with a respective counterweight, pivot means contacting the underside of said platform at the normal center of gravity thereof and forming the sole pivotal mounting means for said platform, and visual aligning means including a pair of vertically extending sight bars attached to perpendicular edges of said platform, said sight bars being located on said edges in such a manner that a straight line formed between the point of contact of either of said sight bars with said platform and the center of gravity of said valance platform will be parallel to the line along which one of said counterweights move and perpendicular to the line along which the other counterweight moves, said visual aligning means further including a pair of fixed scopes, each of said scopes being arranged such that a line passing through the center of gravity of said balance platform and said scopes will be parallel with one or the other of said paths of movement of said counterweights.

2. A device as set forth in claim 1 wherein said fixed scopes are mounted on the respective upper ends of said vertical sight bars.

References Cited by the Examiner

UNITED STATES PATENTS

| | | | |
|---|---|---|---|
| 1,426,103 | 8/1922 | Ralston | 73—65 |
| 2,023,548 | 12/1935 | Ralston | 73—65 |
| 2,410,653 | 11/1946 | Hem | 73—65 |
| 2,782,631 | 2/1957 | Baltrukonis et al. | 73—65 |
| 3,174,330 | 3/1965 | Boundy | 73—65 |

RICHARD C. QUEISSER, *Primary Examiner.*

C. I. McCLELLAND, *Assistant Examiner.*